United States Patent
Obaidi

(10) Patent No.: US 10,122,764 B1
(45) Date of Patent: Nov. 6, 2018

(54) MULTI-FACTOR AND CONTEXT SENSITIVE BIOMETRIC AUTHENTICATION SYSTEM

(71) Applicant: T-Mobile USA, Inc., Bellevue, WA (US)

(72) Inventor: Ahmad Arash Obaidi, Tracy, CA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/496,451

(22) Filed: Apr. 25, 2017

(51) Int. Cl.
*H04L 29/06* (2006.01)
*G06F 3/0482* (2013.01)

(52) U.S. Cl.
CPC .......... *H04L 63/20* (2013.01); *H04L 63/0861* (2013.01); *H04L 63/102* (2013.01); *G06F 3/0482* (2013.01)

(58) Field of Classification Search
CPC ... H04L 63/20; H04L 63/0861; H04L 63/102; G06F 3/0482
See application file for complete search history.

(56) References Cited

U.S. PATENT DOCUMENTS

| | | | | |
|---|---|---|---|---|
| 7,086,085 B1 * | 8/2006 | Brown | ..................... | G06F 21/31 714/E11.207 |
| 8,255,698 B2 * | 8/2012 | Li | .......................... | G06F 21/32 455/433 |
| 8,701,157 B1 * | 4/2014 | Wilson | .................... | H04L 63/08 726/1 |
| 9,305,155 B1 * | 4/2016 | Vo | .......................... | G06F 21/32 |
| 9,589,118 B2 * | 3/2017 | Agarwal | ................. | G06F 21/31 |
| 2002/0154793 A1 * | 10/2002 | Hillhouse | .......... | G06K 9/00087 382/115 |
| 2004/0036574 A1 * | 2/2004 | Bostrom | ............ | G06K 9/00973 340/5.82 |

(Continued)

OTHER PUBLICATIONS

Inbavalli, P. et al., "Body Odor as a Biometric Authentication." (IJCSIT) International Journal of Computer Science and Information Technologies, vol. 5 (5) , 2014, pp. 6270-6274. (Year: 2014).*

(Continued)

*Primary Examiner* — Michael Pyzocha
(74) *Attorney, Agent, or Firm* — Han Santos, PLLC

(57) ABSTRACT

This disclosure describes techniques that facilitate granting an access privilege to a client device based on selectively authenticating biometric data. Particularly, a biometric authentication system may generate an authentication policy that authenticates a client identity via biometric authentication protocols. The authentication policy may be based on a security policy of the computing resource associated with the access privilege. The biometric authentication protocols may be based on a kinematic behavior, body chemistry, or physical features of the client. Each biometric authentication protocol may be assigned an authentication score that reflects a confidence that a biometric sample used to gain an access privilege does in fact correspond to the client. Further, an authentication policy may include a random selection of biometric authentication protocols that comply with a security policy of the computing resource. An authentication policy may be further based on a client disposition, environmental conditions of the client device, or both.

20 Claims, 6 Drawing Sheets

(56) References Cited

U.S. PATENT DOCUMENTS

| | | | |
|---|---|---|---|
| 2004/0044627 A1* | 3/2004 | Russell | G06Q 20/00 |
| | | | 705/50 |
| 2004/0148526 A1* | 7/2004 | Sands | G06F 21/32 |
| | | | 726/5 |
| 2005/0097320 A1* | 5/2005 | Golan | G06F 21/40 |
| | | | 713/166 |
| 2007/0016777 A1 | 1/2007 | Henderson et al. | |
| 2009/0106820 A1* | 4/2009 | Park | G06F 21/32 |
| | | | 726/2 |
| 2010/0175116 A1* | 7/2010 | Gum | G06F 21/31 |
| | | | 726/6 |
| 2013/0225128 A1* | 8/2013 | Gomar | H04W 12/06 |
| | | | 455/411 |
| 2013/0227651 A1 | 8/2013 | Schultz et al. | |
| 2014/0157401 A1* | 6/2014 | Alameh | G06F 21/45 |
| | | | 726/17 |
| 2014/0189809 A1 | 7/2014 | Koved et al. | |
| 2014/0237587 A1* | 8/2014 | Forbes | G06F 21/32 |
| | | | 726/18 |
| 2014/0313007 A1* | 10/2014 | Harding | G07C 9/00158 |
| | | | 340/5.52 |
| 2015/0324698 A1* | 11/2015 | Karaoguz | H04L 67/22 |
| | | | 706/46 |
| 2015/0350200 A1* | 12/2015 | Li | H04L 63/0861 |
| | | | 726/8 |
| 2016/0055324 A1 | 2/2016 | Agarwal | |
| 2016/0110529 A1* | 4/2016 | Mathew | G06F 21/31 |
| | | | 726/7 |
| 2016/0147987 A1* | 5/2016 | Jang | G06K 9/00087 |
| | | | 726/19 |
| 2016/0170730 A1* | 6/2016 | Ollikainen | G06F 8/61 |
| | | | 717/175 |
| 2016/0180068 A1* | 6/2016 | Das | G06F 21/32 |
| | | | 726/7 |
| 2016/0247013 A1* | 8/2016 | Johansson | G06F 17/30247 |
| 2016/0352790 A1* | 12/2016 | Hollingsworth | H04L 12/4641 |
| 2017/0093920 A1* | 3/2017 | Ducatel | H04L 63/20 |
| 2017/0099278 A1* | 4/2017 | Ducatel | H04L 63/08 |
| 2017/0109514 A1* | 4/2017 | Cheng | G06F 21/32 |
| 2017/0116403 A1* | 4/2017 | Bouse | G06F 21/32 |
| 2017/0153696 A1* | 6/2017 | Jaramillo | G06F 3/011 |
| 2017/0171727 A1* | 6/2017 | DeLoy | H04W 4/16 |
| 2017/0213559 A1* | 7/2017 | Agrawal | G10L 17/24 |
| 2017/0220845 A1* | 8/2017 | Christensen | G06K 9/00033 |
| 2018/0034859 A1* | 2/2018 | Aronowitz | H04L 63/205 |

OTHER PUBLICATIONS

The International Search Report and Written Opinion for PCT Application No. PCT/US2018/025586 dated Jul. 24, 2018, 13 pages.

\* cited by examiner

MULTI-FACTOR AND CONTEXT SENSITIVE BIOMETRIC AUTHENTICATION SYSTEM

BACKGROUND

An authentication of an individual via a biometrics can be particularly based on a measurement of one or more biometric samples. However, at times, environmental conditions or a disposition of a client can make it difficult to process biometrics because of ambient light conditions, noise level, temperature, or moisture. That is, a biometric authentication protocol that is premised on authenticating an image of a client iris, facial profile, or finger-print may be difficult to capture in a brightly lit or a dimly lit environment. Similarly, a biometric authentication protocol that is premised on voice recognition of a client may be difficult to capture in a noise filled environment.

Accordingly, an effectiveness of a biometric authentication protocol may be constrained by the environmental conditions surrounding the client device that is capturing a biometric sample.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
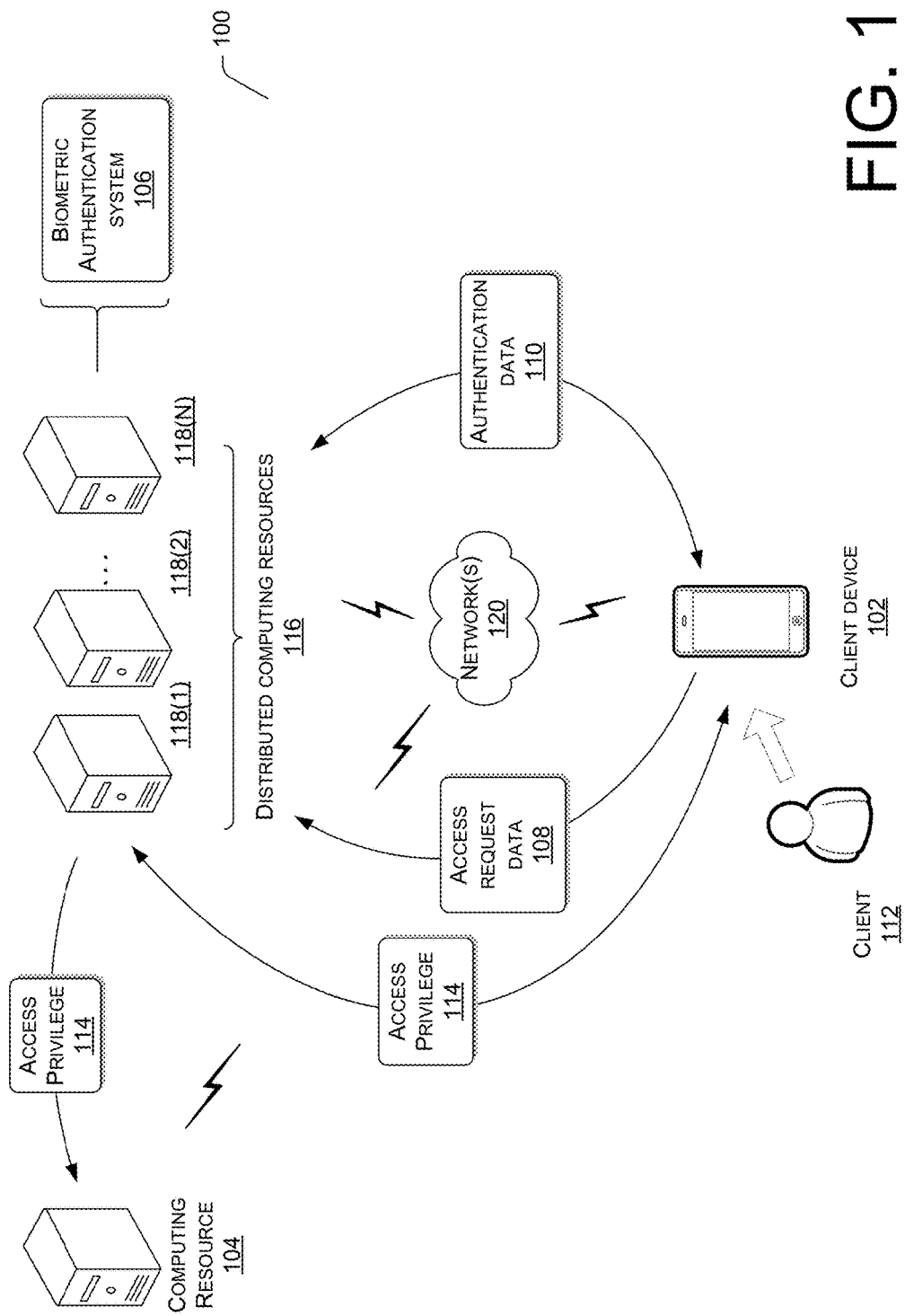
FIG. 1 illustrates a schematic view of a computing environment that facilitates granting a client device with an access privilege to a computing resource based on selectively authenticating biometric data received from the client device.

This disclosure describes techniques that facilitate granting a client device with an access privilege to a computing resource based on selectively authenticating biometric data received from the client device. Particularly, a biometric authentication system may generate an authentication policy that authenticates a client identity via one or more biometric authentication protocols. The authentication policy may be based at least in part on a security policy associated with the computing resource to which the client device has requested an access privilege. The biometric authentication system may be configured to automate and streamline access to computing resource, based on obtrusively and unobtrusively gathering biometric samples of a client requesting access to a computing resource. By automating and streamlining access to such computing resources, the biometric authentication system may reduce an overall volume of communications between a client device and the underlying computing resource, which in turn may translate into a network bandwidth efficiency for the underlying computing resource.

In various examples, a biometric authentication system may authenticate a client identity via one or more biometric authentication protocols configured to comply with a security policy of a computing resource. The biometric authentication protocols may be based on a kinematic behavior of the client, body chemistry of the client, or physical features of the client. Kinematic behavior may correspond to a gait profile of the client, a finger-smear pattern on a user interface of the client device, or a grip configuration of a client device that corresponds to a relative position of fingers of the client while holding the client device. Similarly, biometric authentication protocols based on a body chemistry of the client may include a scent, smell, odor, heart rate, blood pressure, and skin conductance. Further, physical features of a client may include a facial image profile, a finger-print profile, an iris image profile, or a voice recognition profile.

Further, each biometric authentication protocol may be assigned an authentication score that reflects a likelihood that a biometric sample used to gain an access privilege to the computing resource, does in fact correspond to a feature of the client. In other words, the authentication score may a reflect a level of confidence that a person other than the client cannot use their own biometric sample to fraudulently gain access to a computing resource via a biometric authentication protocol.

In some examples, the biometric authentication system may generate an authentication policy by randomly selecting one or more biometric authentication protocols that comply with a security policy of the computing resource. However, at times it may prove difficult to execute a particular biometric authentication protocol based on a disposition of the client or environmental conditions associated with the client device. In these instances, the biometric authentication system may determine a context of operation and environmental conditions to help select biometric authentication protocols to include in the authentication policy.

The context of operation may describe a disposition of the client at a time of a request for access to a computing resource. The context of operation may describe whether the client is running, walking, in conversation with one or more individuals, or in a moving vehicle. Additionally, environmental conditions may determine an intensity of light, sound, smell, moisture, and temperature within the environment proximate to the client device. Thus, the environmental conditions may determine whether that the client is in a noise-filled environment, or is located within a bright or dimly lit space.

In a non-limiting example, the biometric authentication system may determine that a voice-recognition authentication protocol may not be appropriate for a noise-filled environment, or that an image-based authentication protocol may not be appropriate in a brightly lit or dimly lit space. Similarly, a scent-based authentication protocol may not be appropriate in a highly scented environment.

Additionally, the biometric authentication system may facilitate generating a registered biometric template for a biometric authentication protocol. The biometric authentication system may monitor sensor data associated with the client device during a real-time session of authenticated access to a computing resource. In doing so, the sensor data may be used to refine existing biometric authentication protocols, or generate new biometric authentication protocols. In some examples, one or more sensors associated with the client device may unobtrusively monitor a gait profile of the client, a voice of the client, a scent profile of the client, a heart rate, blood pressure, or skin capacitance.

The biometric authentication system may also monitor and detect a location and time that a request for an access privilege is received. For example, a client may typically request an access privilege at a particular geographic location, or at particular times of the day, or day of the week. In doing so, the biometric authentication system may selectively modify a security policy of the computing resource to require more stringent biometrical authentication protocols at times when an access privilege is requested at an atypical geographic location, time of day, or day of the week.

The techniques described herein may be implemented in a number of contexts. Several example implementations and context are provided with reference to the following figures. Further, the term "techniques," as used herein, may refer to system(s), method(s), computer-readable instruction(s), module(s), algorithms, hardware logic, and/or operation(s) as permitted by the context described above and throughout the document.

FIG. 1 illustrates a schematic view of a computing environment 100 that facilitates granting a client device 102 with an access privilege to a computing resource 104 based on selectively authenticating biometric data received from the client device 102. Particularly, a biometric authentication system 106 may generate an authentication policy that authenticates a client identity via one or more biometric authentication protocols. The authentication policy may be based at least in part on a security policy associated with the computing resource 104 to which the client device 102 has requested access.

In the illustrated example, the client device 102 may transmit access request data 108 to the biometric authentication system 106, that includes at least a request for access to a computing resource 104. In some examples, the access request data 108 may also include sensor data associated with the client device 102. The sensor data may be used determine a context of operation and environmental conditions associated with the client device 102. Further, the biometric authentication system 106 may generate an authentication policy that includes one or more biometric authentication protocols, based at least in part on the security policy of the computing resource. In some examples, the authentication policy may be further based at least in part on the context of operation and environmental conditions associated with the client device 102.

Moreover, the biometric authentication system 106 may communicate authentication data 110 to the client device 102 that includes the authentication policy and computer executable instructions that automatically executes the authentication policy on the client device. In response, the client device 102 may communicate authentication data 110 to the biometric authentication system 106 that includes biometric samples that correspond to the one or more biometric authentication protocols of the authentication policy. In response to authenticating an identity of the client 112, the biometric authentication system 106 may provide the client device 102 with an access privilege 114 for the computing resource 104.

In the illustrated example, the biometric authentication system 106 may operate on one or more distributed computing resource(s) 116. The one or more distributed computing resource(s) 116 may include one or more computing device(s) 118(1)-118(N) that operate in a cluster or other configuration to share resources, balance load, increase performance, provide fail-over support or redundancy, or for other purposes. The one or more computing device(s) 118(1)-118(N) may include one or more interfaces to enable communications with other networked devices, such as the client device 102, via one or more network(s) 120. Further, the one or more network(s) 120 may include public networks such as the Internet, private networks such as an institutional and/or personal intranet, or some combination of private and public networks. The one or more network(s) 120 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Furthermore, the client device 102 may include any sort of electronic device, such as a cellular phone, a smart phone, a tablet computer, an electronic reader, a media player, a gaming device, a personal computer (PC), a laptop computer, etc. The client device 102 may have a subscriber identity module (SIM), such as an eSIM, to identify the client device 102 to a telecommunication service provider network (also preferred to herein as "telecommunication network"). Similarly, the computing resource 104 may correspond to any sort of electronic device, such as one of the one or more computing device(s) 118(1)-118(N) or the client device 102.

Figure 2:
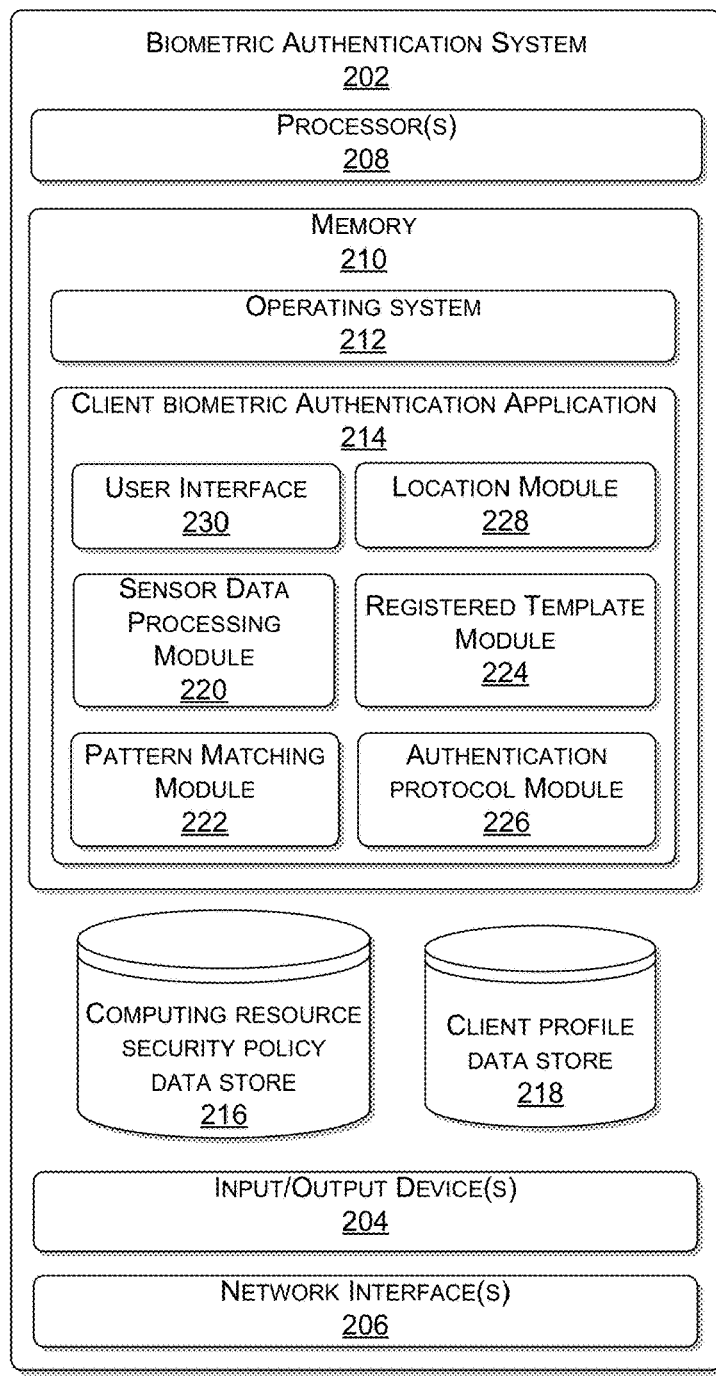
FIG. 2 illustrates a block diagram of a biometric authentication system that facilitates authenticating a client identity by selectively processing biometric samples received from a client device.

FIG. 2 illustrates a block diagram of a biometric authentication system 202 that facilitates authenticating a client identity by selectively processing biometric samples received from a client device. The biometric authentication system 202 may generate an authentication policy that authenticates a client identity via one or more biometric authentication protocols. In various examples, the biometric authentication protocols may be based on a kinematic behavior of the client, body chemistry of the client, or physical features of the client. The biometric authentication system 202 may select a biometric authentication protocol based on an authentication score of the biometric authentication protocol and a security policy associated with the computing resource. Further, a selection may be further based at least in part on a context of operation of the client device, environment conditions of client device, or a combination of both.

In the illustrated example, the biometric authentication system 202 may correspond to the biometric authentication system 106. Further the biometric authentication system 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the biometric authentication system 202 may include network interface(s) 206. The network interface(s) 206 may include any sort of transceiver known in the art. For example, the network interface(s) 206 may include a radio transceiver that performs the function of transmitting and receiving radio frequency communications via an antenna. In addition, the network interface(s) 206 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the biometric authentication system 202 may include one or more processor(s) 208 that are operably connected to memory 210. In at least one example, the one or more processor(s) 208 may be a central processing unit(s) (CPU), graphics processing unit(s) (GPU), a both a CPU and GPU, or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or nonvolatile (ROM) memory.

In some examples, memory 210 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, a biometric authentication application 214, a computing resource security policy data store 216, and a client profile data store 218. The operating system 212 may be used to implement the biometric authentication application 214. The operating system 212 may be any operating system capable of managing computer hardware and software resources. The biometric authentication application 214 may include routines, program instructions, objects, and/or data structures that perform particular tasks or implement particular abstract data types.

The biometric authentication application 214 may include a sensor data processing module 220, a pattern matching module 222, a registered template module 224, an authentication protocol module 226, a location module 228, and a user interface 230. The sensor data processing module 220 may receive and process sensor data associated with one or more sensors of the client device. Further, the sensor data processing module 220 may determine a context of operation of the client device and environmental conditions that are within a predetermined proximity of the client device. The context of operation of a client device may be associated with the disposition of the client at a time of the request for access to a computing resource. The context of operation may describe whether the client is running, walking, in conversation with one or more individuals, or in a moving vehicle. In some examples, a combination of sensor data may be used to describe a context of operation. For example, the sensor data processing module 220 may use sensor data from a GPS sensor, one or more accelerometers, and a proximity sensor to determine that short-wave pendulum oscillations suggest that the client device is being carried by the client while running. Additionally, environmental conditions that may affect the selection and execution of a biometric authentication protocol. For example, the biometric authentication system may determine that the client is in a noise-filled environment, or is located within a bright or dimly lit space. In a non-limiting example, the sensor data processing module 220 may determine an ambient light intensity, ambient noise-level, and an ambient temperature, based on sensor data from an ambient light sensor, a microphone sensor, or thermal sensor.

In other examples, the sensor data processing module 220 may also interpret biometric samples received from a client via the client device. In one example, a biometric sample may include a grip configuration may include the relative position of fingers when holding and touching the mobile device. In other examples, the biometric sample may include a scent or odor of a client, facial image of a client, or a hand thermogram. Further, a facial biometric sample may include a facial thermogram that measures a heat signature of a client' facial region. A heat signature may be limited to features associated with a client's earlobe or lips, which is commensurate with regions of a client's face that the client device is likely to overlap. Other biometric samples, particularly body chemistry samples, may include vascular biometrics such as blood pressure and heart rate.

Further, some biometric samples may be obtained from a client using an unobtrusive process, and thus captured without distracting the client. For example, detecting an image of the user's face, heat beat patterns (or rhythms in heart rate), odor or pheromone may be captured without first drawing the client's attention.

Moreover, the pattern matching module 222 may compare a biometric sample from a client device with a registered biometric template. The pattern matching module 222 may use statistically reliable pattern matching techniques to ensure that biometric samples received from a client device, reliably match a registered biometric template. For example, the pattern matching module 222 may determine a similarity between a biometric sample and a registered biometric template. Authentication of a client identity may be based at least in part on the similarity being greater than a predetermined similarity threshold. The predetermined similarity threshold may be specified within the security policy of the computing resource or within the authentication policy that is transmitted to the client device.

Additionally, the registered template module 224 may generate statistical pattern-matching templates that can be used as registered biometric templates for the purpose biometric authentication. In some examples, a client may proactively generate a registered biometric template based on a selected biometric authentication protocol. In other examples, a registered biometric template may be generated unobtrusively by monitoring client features and posture during real-time sessions of authenticated access to a computing resource. A registered biometric template may model physical features of the client, such as a facial image profile, a finger-print profile, an iris image profile, or a voice recognition profile of client. Further, a registered biometric template may also model a kinematic behavior of a client, such as a gait profile of the client, a finger-smear pattern on a user interface of the client device, or a grip configuration of a client device that corresponds to a relative position of fingers of the client while holding the client device. Additionally, or alternatively, the registered biometric templates may model body chemistry of the client such as, a scent, a smell, an odor, a heart rate, a blood pressure, and a skin conductance of the client.

The registered template module 224 may generate a registered biometric template by receiving a repeated number of a same type of biometric sample. The repetition allows for a construction of a statistically reliable template.

Further, the authentication protocol module 226 may generate an authentication policy for access to a computing resource. In various examples, the authentication policy may include one or more biometric authentication protocols, based at least in part on the security policy of the computing resource. It is noteworthy that a biometric authentication protocol comprises of a request for a particular biometric sample, using a particular sensor of the client device, that may be compared with a particular a registered biometric template. For example, a biometric authentication protocol for a scent profile of client may request sensor data from an olfactory sensor of a client device for the purpose of determining a similarity of the biometric sample with a registered scent-based biometric template of the client.

Moreover, the authentication protocol module 226 may selectively incorporate one or more biometric authentication protocols into the authentication policy based at least in part on the authentication scores of the biometric authentication protocols and a requisite authentication score of the security policy. In a non-limiting example, the authentication protocol module 226 may select a biometric authentication protocol with an authentication score that is greater than the requisite authentication score of the security policy. Alternatively, the authentication protocol module 226 may select a plurality of biometric authentication protocols that in combination generate a total authentication score that is greater than the requisite authentication score of the security policy. In another example, consider a first and second biometric authentication protocol, each of which retain an authentication score that is less than the requisite authentication score of the security policy. In this example, the authentication protocol module 226 may select the first and second biometric authentication protocols, in combination, on the basis that a sum of the respective authentication scores may be greater than the requisite authentication score of the security policy. Additionally, the authentication protocol module 226 may select a plurality of biometric authentication protocols, whereby each biometric authentication protocol has an authentication score that is greater than the requisite authentication score of the security policy.

Additionally, authentication protocol module 226 may configure an authentication policy such that each biometric authentication protocol of a plurality of biometric authentication protocols may be executed in sequential order. Alternatively, or additionally, one or more biometric authentication protocols may periodically authenticate a client identity during a session of authenticated access to the computing resource. In this example, a client may be required to selectively authenticate their identity via the one or more biometric authentication protocols in order to maintain access to the computing resource.

Further, the location module 228 may obtain location data associated with a client device. The location data may be obtained using a Global Positioning System (GPS) sensor, cell tower triangulation, or any other manner that may identify a physical location of a client device.

Moreover, the user interface 230 may facilitate generating a security policy associated with a computing resource. In one example, a service provider or a client may generate a security policy that is associated with a computing resource. The user interface 230 may also facilitate generating a registered biometric template that may be used to generate an authentication policy. In some examples, the user interface 230 may interact with one or more sensors of the client device for the purpose of capturing a predetermined number biometric samples from the client device.

Additionally, the computing resource security policy data store 216 may store the security policies associated with each computing resource. Each security policy may include an indication of a requisite authentication score for biometric authentications protocols that control access to the computing resource. The requisite authentication score may be assigned by one of a service provider or client, whomever retains ownership or control over the computing resource. For example, the requisite authentication score for a security policy that authenticates access to a service provider computing platform may be determined by the service provider. Alternatively, a requisite authentication score of a security policy that protects client personal data on a client device may be determined by the client.

Further, the client profile data store 218 may store the registered biometric templates associated with the client, along with assigned authentication scores. Additionally, the client profile data store 218 may include metadata that describes a geographic location, time of day, or day of the week for particular registered biometric template. For example, a client scent profile may be associated with a client for conditions when the client is running in an environment having a particular ambient temperature.

Figure 3:
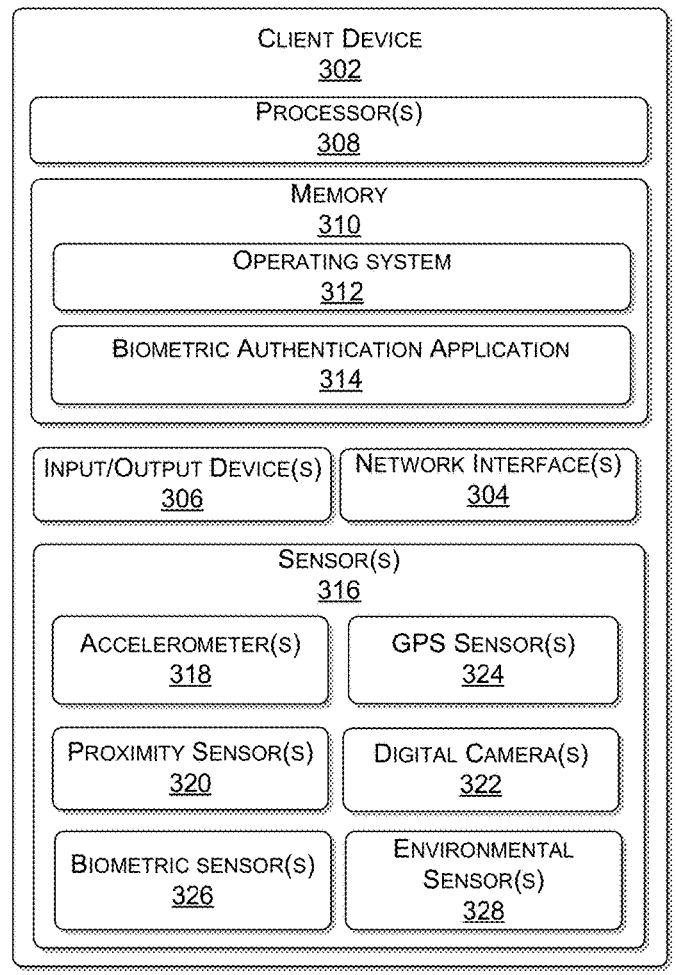
FIG. 3 illustrates a block diagram of a client device that facilitates authenticating a client identity by selectively collecting and transmitting client biometric samples to the biometric authentication system.

FIG. 3 illustrates a block diagram of a client device 302 that facilitates authenticating a client identity by selectively collecting and transmitting client biometric samples to the biometric authentication system 202. The client device 302 may correspond to the client device 102. Further, the client device 302 may include network interface(s) 304 and input/output interface(s) 306 that correspond to network interface(s) 206 and input/output interface(s) 204.

Additionally, the client device 302 may include one or more processor(s) 308 operably connected to memory 310. The one or more processor(s) 308 may correspond to the one or more processor(s) 208, and the memory 310 may correspond to the memory 210.

In the illustrated example, the memory 310 may include an operating system 312 and a biometric authentication application 314. The operating system 312 may be used to implement the biometric authentication application 314. The operating system 312 may be any operating system capable of managing computer hardware and software resources. The biometric authentication application 314 may include routines, program instructions, objects, and/or data structures that perform particular tasks or implement particular abstract data types.

Moreover, the biometric authentication application 314 may be configured to communicate biometric data with the biometric authentication system 202. In some examples, the biometric authentication application 314 may be configured to perform the computational processing that is associated with the one or more modules of the biometric authentication system 202, such as the biometric authentication application 214. In some examples, the memory 310 may include a data store that corresponds to the client profile data store 218, the computing resource security policy data store 216, or both.

Further, the client device may include sensor(s) 316, such as accelerometer(s) 318, proximity sensor(s) 320, digital camera(s) 322, GPS sensor(s) 324, biometric sensor(s) 326, and environmental sensor(s) 328. The one or more accelerometer(s) 318 may be offset from one another in each of the three translational planes. Doing so allows for a calculation of a change in angular orientation of the client device 302. Further, the one or more accelerometer(s) 318 may also measure a vibration or oscillation of the client device 302. In some examples, a measured vibration or oscillation may be used to identify a particular template of movement, such as running, walking, or movement within a vehicle. For example, short-wave pendulum oscillations may suggest that the client device 302 is being held while running, while long-wave pendulum oscillations may suggest that the client device 302 is being held while walking.

Further, proximity sensor(s) 320 and/or digital camera(s) 322 may be used to measure a movement of the client device along a particular axis. In some examples, the proximity sensor(s) 320 may be used to detect stationary, open, or enclosed areas. For example, detecting a stationary area may correspond to a lack of movement of the client device 302. Additionally, the digital camera(s) 322 may record low resolution imagery at a high frame rate that is greater than typical video production. In doing so, imagery may be analyzed to quantify a movement of the client device 302 along a particular axis, or axes.

The GPS sensor(s) 324 may be used to determine a geolocation of the client device 302. In some examples, the geographic location of the client device 302 may be used to enable or disable particular biometric authentication protocols. In a non-limiting example, the GPS sensor(s) 324 may determine that the client device 302 is located at or near a work location or a home location of the client. In doing so, the biometric authentication system 202 may elect to enable particular biometric authentication protocols that rely registered biometric templates created at the work location or the home location of the client, such as odor-based biometric templates.

Environmental sensor(s) 328, such as an ambient light sensor, noise-level sensor, temperature-sensor, and a moisture sensor. In various examples, the environmental sensor(s) 328 may be used to detect environmental conditions associated with the client device 302 at a time that biometrical authentication protocols are to be executed. The environmental sensor(s) 328 may detect an ambient light intensity, an ambient noise-level, an ambient temperature, and an ambient humidity that surrounds the client device 302. Sensor data from the environmental sensor(s) 328 may be transmitted to the biometric authentication system 202 to enable a selection of one or more biometric authentication protocols. For example, sensor data from noise-level sensors that detect a noise-filled environment may suggest that a voice-recognition biometric authentication profile may not be appropriate.

Further, the biometric sensor(s) 326 that may capture a biometric sample of a client may include digital camera(s), a microphone sensor, a capacitance sensor, an odor sensor, a heart-rate sensor, and a thermal sensor. For example, the digital camera(s) 322 may detect physical features of a client, such as physical features of the client, such as a facial image profile, a finger-print profile, an iris image profile. The microphone sensor may detect a voice recognition associated with the client. The voice print may include an accent, tonality, refraction of sound, frequency and pitch of the client voice. The capacitance sensor may detect a grip configuration of a client holding the client device 302. In this example, a biometric sample may comprise of the relative position of fingers when holding and touching the client device 302. The odor sensor may detect a smell, scent, or odor associated with the client. In some examples, the odor sensor may detect a smell, scent, or odor within a particular region of the client body, such as a side of the head, or adjacent to an eye lobe. In other examples, the odor sensor may detect a general smell, scent, or odor that is within a predetermined distance of the client body. Further, the heart-rate sensor may detect a heart rate of the client, and the thermal sensor may generate a thermogram of a client hand, face, or other body part.

Figure 4:
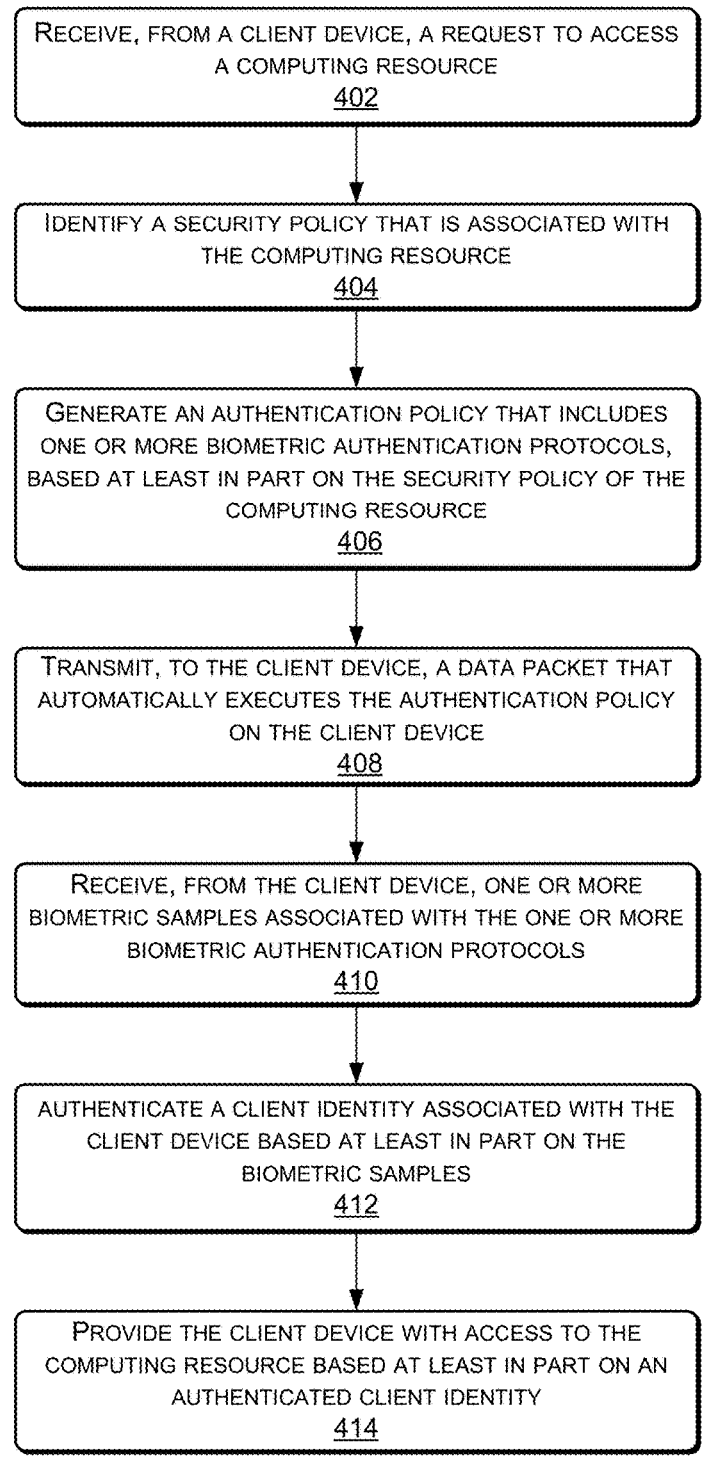
FIG. 4 illustrates a biometric authentication system process that authenticates a client identity via one or more biometric authentication protocols configured to comply with a security policy of a computing resource.
Figure 5:
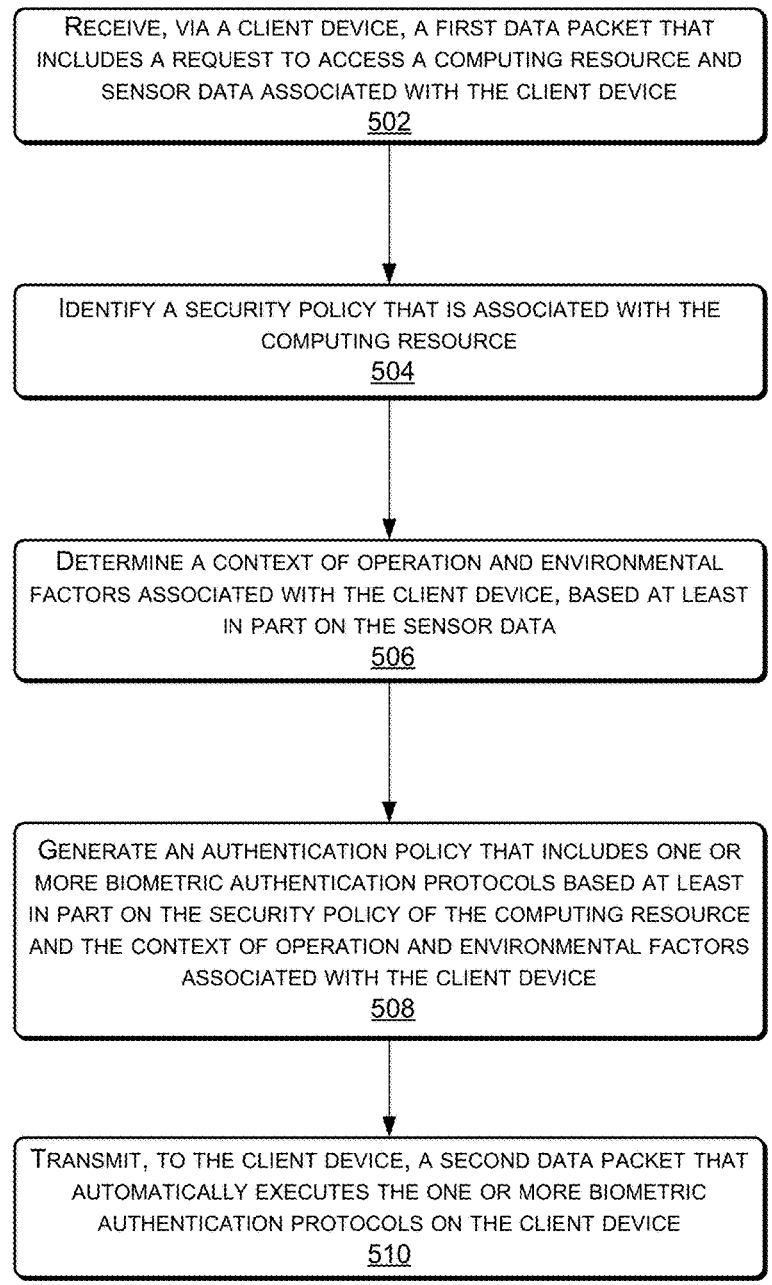
FIG. 5 illustrates a biometric authentication system process that generates an authentication policy based on a context of operation and environmental conditions of the client device.
Figure 6:
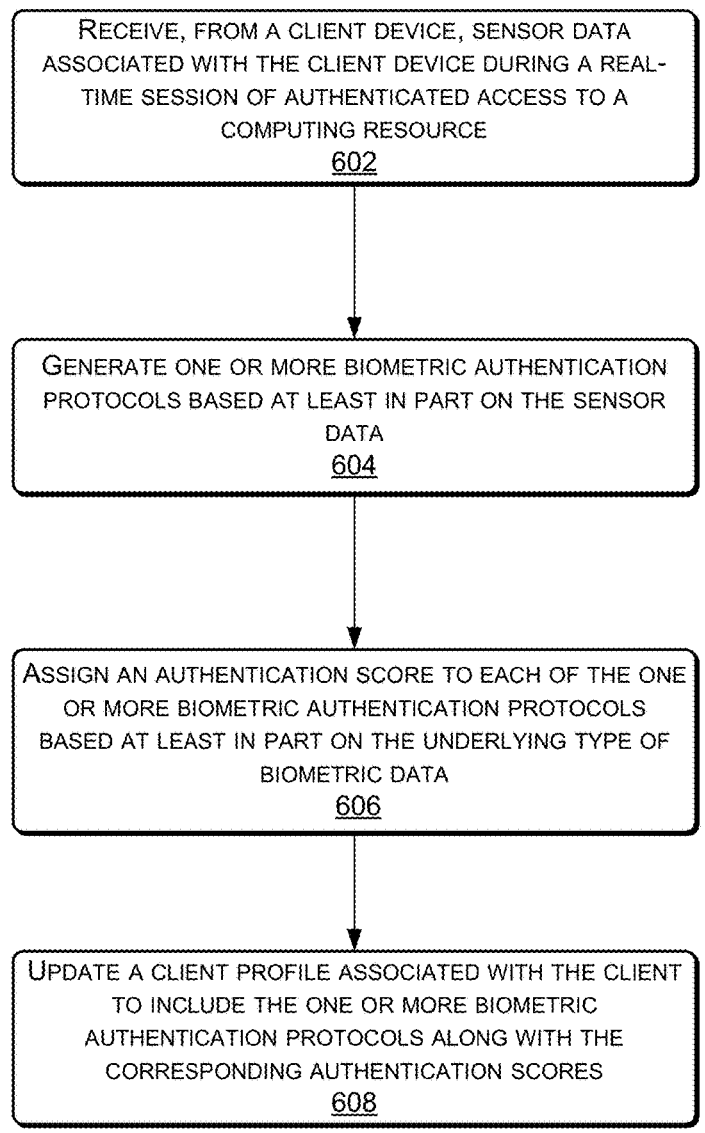
FIG. 6 illustrates a biometric authentication system process for obtrusively and unobtrusively generating a registered biometric template for a biometric authentication protocol.

FIGS. 4, 5, and 6 present processes 400, 500, and 600 that relate to operations of the biometric authentication system, and more specifically generating and executing an authentication policy. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a biometric authentication system process that authenticates a client identity via one or more biometric authentication protocols configured to comply with a security policy of a computing resource. The biometric authentication protocols may be based on a kinematic behavior of the client, body chemistry of the client, or physical features of the client. For example, a kinematic behavior may correspond to a gait profile of the client, a finger-smear pattern on a user interface of the client device, or a grip configuration of a client device that corresponds to a relative position of fingers of the client while holding the client device. In some examples, biometric authentication protocols based on a body chemistry of the client may include, but are not limited to, scent, smell, odor, heart rate, blood pressure, and skin conductance. A client device may be equipped with one or more body chemistry sensors that capture body biometric samples of the client. In some instances, biometric samples may be captured unobtrusively, while in other instances, a client may engage with a user interface of the client device. Further, physical features of a client may include, but are not limited to, a facial image profile, a finger-print profile, an iris image profile, or a voice recognition profile.

Further, each biometric authentication protocol may be assigned an authentication score that reflects a likelihood that a biometric sample used to gain an access privilege to the computing resource, does in fact correspond to a feature of the client. In other words, the authentication score may a reflect a level of confidence that a person other than the client cannot use their own biometric sample to fraudulently gain access to a computing resource via a biometric authentication protocol.

In a non-limiting example, the authentication score may comprise of a numerical value that reflects the likelihood that the biometric sample used to gain an access privilege to the computing resource does in fact correspond to a feature of the client. The authentication score may vary from a value that reflects a least secure biometric authentication protocol condition to a most secure biometric authentication protocol. A least secure biometric authentication protocol may reflect a condition whereby a counterfeit biometric sample may provide access privilege to a computing resource. Further, the most secure authentication protocol may reflect a condition whereby a counterfeit biometric sample is unlikely to provide an access privilege to the computing resource.

At 402, the biometric authentication system may receive from a client device, a request to access a computing resource. In various examples, the computing resource may correspond to a software application that is installed on the client device. In other examples, the computing resource may be stored on a remote server that is accessed via one or more communications networks.

At 404, the biometric authentication system may identify a security policy that is associated with the computing resource. In some examples, the security policy may be stored within a data store of the biometric authentication system. Further, the security policy may include a requisite authentication score for biometric authentication protocols that control access to the computing resource. The requisite authentication score may be assigned by one of a service provider or client, whomever retains ownership or control over the computing resource. For example, the requisite authentication score for a security policy that authenticates access to a service provider computing platform may be determined by the service provider. Alternatively, a requisite authentication score of a security policy that protects client personal data on a client device may be determined by the client.

At 406, the biometric authentication system may generate an authentication policy that includes one or more biometric authentication protocols, based at least in part on the security policy of the computing resource. In a non-limiting example, the biometric authentication system may select a biometric authentication protocol with an authentication score that is greater than a requisite authentication score associated with the security policy. Alternatively, the biometric authentication system may select a plurality of biometric authentication protocols that in combination generate a total authentication score that is greater than the requisite authentication score associated with the security policy. For example, consider a first and second biometric authentication protocol, each of which retain an authentication score that is less than the requisite authentication score of the security policy. In this example, the biometric authentication system may select the first and second biometric authentication protocols, in combination, on the basis that a sum of the respective authentication scores may be greater than the requisite authentication score of the security policy.

Further, the biometric authentication system may select a plurality of biometric authentication protocols, whereby each biometric authentication protocol has an authentication score that is greater than the requisite authentication score of the security policy. In one example, each biometric authentication protocol may be executed in sequential order. Alternatively, or additionally, one or more biometric authentication protocols may periodically authenticate a client identity during a session of authenticated access to the computing resource. In this example, a client may be required to selectively authenticate their identity via the one or more biometric authentication protocols in order to maintain access to the computing resource.

At 408, the biometric authentication system may transmit to the client device, a data packet that includes the authentication policy for access to the computing resource. In some examples, the data packet may include computer executable instructions that automatically execute the one or more biometric authentication protocols of the authentication policy, on the client device.

At 410, the biometric authentication system may receive one or more biometric samples associated with the one or more biometric authentication protocols. In various examples, the one or more biometric samples may correspond to a kinematic behavior of the client, a body chemistry of the client, or physical features of the client.

At 412, the biometric authentication system may authenticate a client identity associated with the client device, based at least in part on the one or more biometric samples. The biometric authentication system may selectively compare each biometric sample with a registered biometric template that corresponds to the biometric authentication protocol. For example, the biometric authentication system may receive a biometric sample that corresponds to a finger-print or a voice recognition of a client. In doing so, the biometric authentication system may access registered biometric templates that corresponds to the finger-print or the voice recognition of the client.

At 414, the biometric authentication system may provide the client device with access to the computing resource based at least in part on authenticating the identity of the client. In some examples, an authentication of a client identity may be based at least in part on a similarity of the biometric sample and the registered biometric template being greater than a predetermined similarity threshold. The predetermined similarity threshold may be specified within the security policy of the computing resource or within the authentication policy that is transmitted to the client device.

FIG. 5 illustrates a biometric authentication system process that generates an authentication policy based on a context of operation and environmental conditions of the client device. In some examples, the biometric authentication system may generate an authentication policy by randomly select one or more biometric authentication protocols that comply with a security policy of the computing resource. However, at times it may prove difficult to execute a particular biometric authentication protocol based on a disposition of the client or environmental conditions associated with the client device. In these instances, the biometric authentication system may determine a context of operation and environmental conditions to help select biometric authentication protocols to include in the authentication policy.

The context of operation may describe a disposition of the client at a time of a request for access to a computing resource. The context of operation may describe whether the client is running, walking, in conversation with one or more individuals, or in a moving vehicle. Additionally, environmental conditions may determine an intensity of light, sound, smell, moisture, and temperature within the environment proximate to the client device. Thus, the environmental conditions may determine whether that the client is in a noise-filled environment, or is located within a bright or dimly lit space.

In a non-limiting example, the biometric authentication system may determine that a voice-recognition authentication protocol may not be appropriate for a noise-filled environment, or that an image-based authentication protocol may not be appropriate in a brightly lit or dimly lit space. Similarly, a scent-based authentication protocol may not be appropriate in a highly scented environment.

At 502, the biometric authentication system may receive from a client device, a data packet that includes a request to access a computing resource and sensor data associated with the client device. The computing resource may correspond to a software application that is installed on the client device. In other examples, the computing resource may be stored on a remote server that is accessed via one or more communications networks.

Further, the sensor data may indicate a particular type of motion of a client associated with the client device, such walking or running, or a particular geographic location, such as a home location or a work location. In some examples, the one or more sensors that detect a movement of the client device may include accelerometer(s), proximity sensor(s), gyroscope(s), digital camera(s), or global positioning system (GPS) sensor(s).

Similarly, sensor data may indicate environmental conditions within a predetermined proximity of the client device, such as an ambient light intensity, ambient noise-level, and an ambient temperature. In some examples, the one or more sensors that detect environmental conditions may include an ambient light sensor, a microphone sensor, or thermal sensor.

At 504, the biometric authentication system may identify a security policy that is associated with the computing resource. In some examples, the security policy may be stored within a data store of the biometric authentication system. In other examples, the security policy may be stored within a remote server of the service provider and selectively accessed at each instance of authentication.

At 506, the biometric authentication system determine a context of operation and environmental conditions associated with the client device, based at least in part on the sensor data. For example, the sensor data may determine various environmental conditions associated with the client device. For example, sensor data from a global position system (GPS) sensor and one or more accelerometer(s) may approximate a movement of the client device, and further determine whether the client is stationary, walking, running, or in a moving vehicle. Further, sensor data from a proximity sensor may determine whether the client device is likely stored in an enclosed area, such as a client's bag or a client's waist pocket. Moreover, a combination of sensor data from a GPS sensor, one or more accelerometers, and proximity sensor may determine that short-wave pendulum oscillations suggest that the client device is being carried by the client while walking.

Similarly, sensor data may also determine environmental conditions within a predetermined proximity of the client device. For example, a microphone sensor may determine whether the client device is in a noise-filled space or a quiet space, an ambient light sensor may determine whether the client is in a brightly lit or dimly lit space, and an ambient temperature sensor may determine an ambient environmental temperature that proximate to the client device.

At 508, the biometric authentication system may generate an authentication policy that includes one or more biometric authentication protocols, based at least in part on the security policy of the computing resource, and the context of operation and environmental conditions associated with the client device. For example, the biometric authentication system may identify a set of biometric authentication protocols that comply with the security policy of the computing resource. Further, the biometric authentication system may determine a movement of a client and environmental conditions surrounding the client to select an appropriate biometric authentication protocol from the set of biometric authentication protocols.

For example, sensor data that indicates that the client device is located in a noise-filled space may cause the biometric authentication system select a biometric authentication protocol other than one associated with a voice recognition profile. Similarly, sensor data that indicates that the client device is being accessed while walking or running may cause the biometric authentication system to avoid image-based biometric authentication protocols that may capture stuttering images. Additionally, sensor data that indicates that the client device is located in a highly-scented space, or that the client is wearing an overpowering perfume or fragrance may cause the biometric authentication protocol to selectively avoid including a scent-based biometric authentication protocol within the authentication policy.

At 510, the biometric authentication system may transmit to the client device, a second data packet that automatically executes the one or more biometric authentication protocols on the client device. In some examples, each biometric authentication protocol may be executed in sequential order. Alternatively, or additionally, one or more biometric authentication protocols may periodically authenticate a client identity during a session of authenticated access to the computing resource. In this example, a client may be required to selectively authenticate their identity via the one or more biometric authentication protocols in order to maintain access to the computing resource.

FIG. 6 illustrates a biometric authentication system process for obtrusively or unobtrusively generating a registered biometric template for a biometric authentication protocol. The biometric authentication system may monitor sensor data associated with the client device during a real-time session of authenticated access to a computing resource. In doing so, the sensor data may be used to refine existing biometric authentication protocols, or generate new biometric authentication protocols. In some examples, one or more sensors associated with the client device may unobtrusively monitor a gait profile of the client, a voice of the client, a scent profile of the client, a heart rate, blood pressure, or skin capacitance of the client.

In some examples, the biometric authentication system may generate a plurality of client profiles for a particular biometric authentication protocol. Each client profile may be based on biometric samples captured at different geographic locations, times of the day, days of the week, or detected movements of the client device. For example, the biometric authentication system may generate a first scent profile for a client for occasions that the client is inactive, a second scent profile for occasions that the client is walking, and a third scent profile for occasions that the client is running.

The biometric authentication system may also monitor and detect a location and time that a request for an access privilege is received. For example, a client may typically request an access privilege at a particular geographic location, or at particular times of the day, or day of the week. In doing so, the biometric authentication system may selectively modify a security policy of the computing resource to require more stringent biometrical authentication protocols at times when a request for an access privilege is received at an atypical geographic location, time of day, or day of the week.

At 602, the biometric authentication system may receive sensor data associated with a client device, during a real-time session of authenticated access to a computing resource. In a non-limiting examples, one or more sensors associated with the client device may unobtrusively monitor a gait profile of the client, a voice profile of the client, a scent profile of the client, along with other body chemistry characteristics, such as heart rate, blood pressure, and skin capacitance. Further, sensor data may include metadata that describes a geographic location, time of day, and day of the week that is associated with each instance of monitored sensor data.

At 604, the biometric authentication system may generate one or more biometric authentication protocols based at least in part on the sensor data and associated metadata. For example, a scent profile for a client may be generated for conditions when a client is running in an environment having a particular ambient temperature.

At 606, the biometric authentication system may assign an authentication score to each of the one or more biometric authentication protocols based at least in part on the underlying type of biometric data. For example, the authentication score may reflect a level of confidence that an individual other than the client may cannot use their own biometric sample, in place of a biometric sample belonging to the client, to gain access to a computing resource via a biometric authentication protocol. Thus, a voice-recognition authentication protocol may have a lower authentication score relative to a scent recognition authentication protocol on the basis that a client voice may be easier to imitate relative to a scent.

At 608, the biometric authentication system may update a client profile associated with the client to include the one or more biometric authentication protocols along with corresponding authentication scores. In some instances, the biometric authentication system may update existing biometric authentication protocols with a client profile, or include new biometric authentication protocols within the client profile. In some instances, an accuracy of an existing biometric authentication protocol may be improved via updating of the client profile. In some instances, an authentication score of an updated biometric authentication protocol may correspondingly improve.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
generating a first registered template and a second registered template that correspond to at least one of a plurality of biometric authentication protocols, the first registered template being based at least in part on a first set of biometric samples received at a first time of day and the second registered template being based at least in part on a second set of biometric samples received at a second time of day, the first time of day being different from the second time of day;
receiving, from a client device, a request for access to a computing resource and an indication of a particular time of day associated with receipt of the request;
identifying a security policy associated with the computing resource;
selecting, from the plurality of biometric authentication protocols, at least one biometric authentication protocol, based at least in part on the security policy of the computing resource;
generating an authentication policy for access to the computing resource, the authentication policy including the at least one biometric authentication protocol;
transmitting a first data packet to the client device that includes the authentication policy and computer executable instructions that automatically execute the authentication policy on the client device;
receiving, from the client device, a second data packet that includes a biometric sample that corresponds to the at least one biometric authentication protocol;
correlating the particular time of day associated with receipt of the request to the first time of day associated with the first registered template;
authenticating an identity of a client associated with the client device, based at least in part on the biometric sample and the first registered template; and
providing the client device with access to the computing resource.

2. The computer-implemented method of claim 1, further comprising:
comparing the biometric sample with the first registered template; and
determining an authentication score that indicates a likelihood that the biometric sample that correlates with the first registered template also correlates to a corresponding biometric feature of the client, and
wherein selecting the at least one biometric authentication protocol is further based at least in part on the authentication score.

3. The computer-implemented method of claim 1, further comprising:
causing a user interface of the client device to display one or more selectable options to create a registered biometric template;
receiving, via the user interface, a selection to create at least one of the first registered template or the second registered template;
prompting, via the user interface, the client to submit an initial biometric sample that is to be associated with the at least one of the first registered template or the second registered template; and
generating at least one of the first registered template or the second registered template based at least in part on receipt of the initial biometric sample.

4. The computer-implemented method of claim 1, prior to further comprising:

receiving sensor data from the client device, the sensor data indicating environmental conditions at a location of the client device, the sensor data including at least one of ambient light intensity, ambient noise level, or ambient temperature, and wherein selecting the at least one biometric authentication protocol is based at least in part on the sensor data.

5. The computer-implemented method of claim 1, further comprising:

identifying a set of biometric authentication protocols from the plurality of biometric authentication protocols, based at least in part on the security policy of the computing resource, and wherein selecting the at least one biometric authentication protocol occurs randomly from the set of biometric authentication protocols.

6. The computer-implemented method of claim 1, wherein the at least one biometric authentication protocol is a first biometric authentication protocol, and further comprising:

determining a first authentication score that is associated with the first biometric authentication protocol, and a second authentication score that is associated with a second biometric authentication protocol of the plurality of biometric authentication protocols;

determining that the first authentication score and the second authentication score are less than a predetermined score threshold of the security policy of the computing resource; and determining that a summation of the first authentication score and the second authentication score is greater than the predetermined score threshold of the security policy of the computing resource, and wherein the authentication policy further includes the second biometric authentication protocol.

7. The computer-implemented method of claim 1, further comprising:

receiving, from the client device, sensor data that indicates a motion of the client at a same point in time as receipt of the request for access to the computing resource;

determining a context of operation of the client device, based at least in part on the sensor data, the context of operation corresponding to a disposition of the client associated with the client device, the disposition of the client being one of a running motion, a walking motion, a conversation with one or more individuals, or a moving vehicle motion; and determining that the context of operation corresponds to a running disposition, and wherein, selecting the at least one biometric authentication protocol corresponds to a scent authentication protocol, based at least in part on the context of operation.

8. The computer-implemented method of claim 1, further comprising:

monitoring, via the client device, an additional biometric sample during an authenticated session of access to the computing resource, the additional biometric sample associated with the at least one biometric authentication protocol; and refining, a registered template associated with the at least one biometric authentication protocol, based at least in part on the additional biometric sample.

9. The computer-implemented method of claim 8, further comprising:

retrieving the additional biometric sample unobtrusively from the client device.

10. The computer-implemented method of claim 1, further comprising:

determining a geographic location of the client device in response to receipt of the request for access to the computing resource; and modifying the security policy associated with the computing resource, based at least in part on the geographic location of the client device.

11. A system, comprising:

one or more processors;

memory coupled to the one or more processors, the memory including one or more modules that are executable by the one or more processors to:

generate a first registered template and a second registered template that correspond to at least one of a plurality of biometric authentication protocols, the first registered template being based at least in part on a first set of biometric samples received at a first time of day and the second registered template being based at least in part on a second set of biometric samples received at a second time of day, the first time of day being different from the second time of day;

receive a first data packet from a client device, the first data packet including a request for access to a computing resource and an indication of a particular time of day associated with receipt of the first data packet;

identify a security policy associated with the computing resource;

generate an authentication policy to authenticate an identity of a client associated with the client device, based at least in part on the security policy, the authentication policy including at least one biometric authentication protocol of the plurality of biometric authentication protocols;

generate a second data packet for transmission to the client device, the second data packet including computer executable instructions that automatically execute the authentication policy on the client device;

receive a third data packet from the client device, the third data packet including at least one biometric sample of the client that corresponds to the at least one biometric authentication protocol; and authenticate the identity of the client based at least in part on the at least one biometric sample and the first registered template, in response to a correlation of the particular time of day associated with receipt of the request to the first time of day associated with the first registered template.

12. The system of claim 11, wherein the request for access to the computing resource further includes sensor data associated with the client device, and wherein the one or more modules are further executable by the one or more processors to:

access, via a data store, a client profile associated with the client, the client profile including data entries that indicate one or more previous contexts of operation that correspond with previously authenticated requests for access to the computing resource, the one or more previous contexts of operation corresponding to dispositions of the client associated with the client device at times of previous requests for access to the computing resource;

determine a context of operation of the client device, based at least in part on the sensor data, the context of operation corresponding to a disposition of the client at the particular time of day associated with receipt of the request; and determine a similarity between the context of operation and the one or more previous contexts of operation, and wherein to generate the authentication policy is further based at least in part on the similarity being greater than a predetermined similarity threshold.

13. The system of claim 11, wherein the one or more modules are further executable by the one or more processors to:

receive, from the client device, environmental sensor data at a same point in time as receipt of the request for access to the computing resource, the environmental sensor data including at least one of a geographic location of the client device, an ambient light intensity and an ambient noise level, and wherein the at least one biometric authentication protocol of the authentication policy corresponds to one of an image-based recognition protocol or a voice-based recognition protocol, based at least in part on the ambient light intensity and the ambient noise level.

14. The system of claim 11, wherein the at least one biometric authentication protocol of the authentication policy includes a scent recognition protocol, and wherein the one or more modules are further executable by the one or more processors to:

determine an ambient scent associated with the client device, based at least in part on an olfactory sensor of the client device, and wherein at least one biometric authentication protocol of the authentication policy corresponds to the scent recognition protocol based at least in part on the ambient scent being less than a predetermined scent threshold.

15. The system of claim 11, wherein the one or more modules are further executable by the one or more processors to:

determine a similarity between the at least one biometric sample and the first registered template, and wherein to authenticate the identity of the client is based at least in part on the similarity being greater than a predetermined similarity threshold.

16. The system of claim 11, wherein the one or more modules are further executable by the one or more processors to:

monitor, one or more body chemistry patterns of the client during one or more sessions of authenticated access to the computing resource, the one or more body chemistry patterns including at least a scent profile of the client;

generate the first registered template and the second registered template, based at least in part on the one or more body chemistry patterns; and store the first registered template and the second registered template within a client profile associated with the client.

17. The system of claim 11, wherein the one or more modules are further executable by the one or more processors to:

monitor, a kinematic behavior of the client during one or more sessions of authenticated access to the computing resource, the kinematic behavior including at least a gait profile of the client, or a grip configuration of the client device, the grip configuration corresponding to a relative position of fingers of the client while holding the client device;

generate the first registered template and the second registered template based at least in part on the kinematic behavior; and store the first registered template and the second registered template within a client profile associated with the client.

18. One or more non-transitory computer-readable media storing computer-executable instructions, that when executed on one or more processors, causes the one or more processors to perform acts comprising:

generating a first registered template and a second registered template that correspond to at least one of a plurality of biometric authentication protocols, the first registered template being based at least in part on a first set of biometric samples received at a first time of day and the second registered template being based at least in part on a second set of biometric samples received at a second time of day, the first time of day being different from the second time of day;

receiving, from a client device, a request for access to a computing resource, the request further including an indication of a particular time of day associated with receipt of the request;

identifying a security policy associated with the computing resource;

generating an authentication policy for access to the computing resource, based at least in part on the security policy, the authentication policy including at least one biometric authentication protocol of the plurality of biometric authentication protocols;

transmitting a data packet to the client device that automatically execute the authentication policy on the client device;

receiving, from the client device, at least one biometric sample that corresponds to the at least one biometric authentication protocol; and authenticating a client identity based at least in part on the biometric sample and the first registered template of the at least one biometric authentication protocol, in response to a correlation of the particular time of day associated with receipt of the request to the first time of day associated with the first registered template.

19. The one or more non-transitory computer-readable media of claim 18, wherein the plurality of biometric authentication protocols includes at least a voice-recognition authentication protocol and a scent-recognition authentication protocol, and further comprising:

receiving from the client device and at a same point in time as receipt of the request for access to the computing resource, sensor data including at least an ambient noise level that surrounds the client device;

determining that the ambient noise level is greater than a predetermined noise threshold; and selecting the scent-recognition authentication protocol as the at least one biometric authentication protocol, based at least in part on the ambient noise level.

20. The one or more non-transitory computer-readable media of claim 18, wherein the plurality of biometric authentication protocols includes at least a scent-recognition authentication protocol and a facial image-recognition authentication protocol, and further comprising:

determining a context of operation of the client device, based at least in part on sensor data associated with the client device, the context of operation corresponding to a disposition of a client associated with the client device at the particular time of day associated with receipt of the request; and selecting the scent-recognition authentication protocol as the at least one biometric authentication protocol, based at least in part on the context of operation.

* * * * *